(12) United States Patent
Auner et al.

(10) Patent No.: US 9,278,865 B2
(45) Date of Patent: Mar. 8, 2016

(54) METHOD FOR PRODUCING HEXACHLORODISILANE

(75) Inventors: Norbert Auner, Glashuetten (DE); Christian Bauch, Muldenstein (DE); Sven Holl, Gueckingen (DE); Rumen Deltschew, Leipzig (DE); Javad Mohsseni, Bitterfeld-Wolfen (DE); Gerd Lippold, Leipzig (DE); Thoralf Gebel, Dresden (DE)

(73) Assignee: Spawnt Private S.à.r.l., Luxembourg (LU)

( * ) Notice: Subject to any disclaimer, the term of this patent is extended or adjusted under 35 U.S.C. 154(b) by 855 days.

(21) Appl. No.: 13/512,678

(22) PCT Filed: Dec. 2, 2010

(86) PCT No.: PCT/EP2010/068728
§ 371 (c)(1),
(2), (4) Date: Sep. 12, 2012

(87) PCT Pub. No.: WO2011/067331
PCT Pub. Date: Jun. 9, 2011

(65) Prior Publication Data
US 2013/0017138 A1 Jan. 17, 2013

(30) Foreign Application Priority Data
Dec. 2, 2009 (DE) .......................... 10 2009 056 438

(51) Int. Cl.
*C01B 33/107* (2006.01)

(52) U.S. Cl.
CPC .......... *C01B 33/107* (2013.01); *C01B 33/10773* (2013.01)

(58) Field of Classification Search
CPC .................. C01B 33/10773; C01B 33/107
See application file for complete search history.

(56) References Cited

U.S. PATENT DOCUMENTS

| 2009/0169457 A1* | 7/2009 | Auner et al. ................. 423/342 |
| 2010/0178230 A1 | 7/2010 | Saika et al. |
| 2010/0221169 A1 | 9/2010 | Knies et al. |

FOREIGN PATENT DOCUMENTS

| DE | 1 079 607 | 4/1960 |
| DE | 1 132 901 | 1/1963 |
| DE | 36 23 493 | 1/1987 |
| DE | 10 2007 000 841 A1 | 4/2009 |
| EP | 0283905 | 9/1988 |
| EP | 1 264 798 A1 | 12/2002 |
| EP | 2 067 745 A2 | 6/2009 |
| GB | 702349 | 1/1954 |
| JP | 61-205614 | 9/1986 |

(Continued)

OTHER PUBLICATIONS

Japanese Examination Report dispatched Mar. 5, 2014 from corresponding Japanese Patent Application No. 2012-541506.

(Continued)

*Primary Examiner* — Jennifer A Smith
(74) *Attorney, Agent, or Firm* — DLA Piper LLP (US)

(57) ABSTRACT

A method produces hexachlorodisilane. Hexachlorodisilane is obtained by oxidative splitting of the chlorinated polysilane of the empirical formula $SiCl_x$ ($x=0,2-0,8$) using chlorine gas. The hexachlorodisilane is selectively obtained with a high yield.

12 Claims, 7 Drawing Sheets

(56) References Cited

FOREIGN PATENT DOCUMENTS

| | | |
|---|---|---|
| JP | 2008-542162 | 11/2008 |
| JP | 2009-149502 | 7/2009 |
| JP | 2009-543828 | 12/2009 |
| JP | 2010-517922 | 5/2010 |
| TW | 200642954 | 12/2006 |
| TW | 200734032 | 9/2007 |
| TW | 200906723 | 2/2009 |
| WO | 2006/125425 | 11/2006 |
| WO | 2008/009473 A1 | 1/2008 |
| WO | 2009/143823 | 12/2009 |
| WO | 2009/143824 | 12/2009 |
| WO | 2009/143825 A2 | 12/2009 |

OTHER PUBLICATIONS

Bonitz, E., "Reaktionen des Elementarem Siliciums," *Angew. Chem.*, Jan. 1966, vol. 78, No. 9, pp. 475-482 and 2 sheets of English translation of Abstract.

Schmeisser, V.M. et al., "Über das Siliciumdichlorid [SiCl$_2$]$_x$$^1$)," *Zeitschrift für Anorganische and Allgemeine Chemie. Band*, 1964, vol. 334, pp. 50-56 and 1 sheet of English translation of Abstract.

Bonitz, E., "Ein newer Weg zur Herstellung von aktivem Silicium oder Siliciummonochlorid," *Chemische Berichte* 94, 1961, cover, pp. 220-225 and 1 sheet of English translation of Abstract.

Taiwanese Examination Report dated May 12, 2014 along with an English translation from corresponding Taiwanese Patent Application No. 099141843.

\* cited by examiner

US 9,278,865 B2

METHOD FOR PRODUCING HEXACHLORODISILANE

RELATED APPLICATIONS

This is a §371 of International Application No. PCT/EP2010/068728, with an international filing date of Dec. 2, 2010 (WO 2011/067331, published Jun. 9, 2011), which is based on German Patent Application No. 10 2009 056438.1 filed Dec. 2, 2009, the subject matter of which is incorporated herein by reference.

TECHNICAL FIELD

This disclosure relates to a method for producing hexachlorodisilane ($Si_2Cl_6$).

BACKGROUND

Hexachlorodisilane is ah important precursor for producing silicon and, for hydrogenation, derivatization, etc. Various methods are known for producing hexachlorodisilane.

There is a general problem with the known methods of production, however, in that hexachlorodisilane is only obtained in mixtures with further oligomers, so that additional extensive separating steps are required to recover the hexachlorodisilane.

EP 283 905 discloses producing mixtures of $Si_2Cl_6$ and $Si_3Cl_8$ with $SiC_4$ by copper-catalyzed reaction of silicon at 140-300° C. The yield of oligosilanes reaches more than 40%, based on the amount of silicon used. The above-mentioned separating steps are required to recover hexachlorodisilane.

GB 702 349 discloses the reaction of gaseous $SiCl_4/Cl_2$ mixtures with silicon compounds or silicon alloys, for example $CaSi_2$, at 90-250° C. to obtain mixtures of perchlorinated oligosilanes. $Si_2Cl_6$ is detected in the product mixture at 40-55% by weight. Again, the separation processes mentioned are required to effect isolation.

M. Schmeisser, P. Voss, Zeitschrift für anorganische und allgemeine Chemie 334 (1964) 50 discloses that perchlorinated polysilanes are degraded by chlorine gas at 60° C. to mixtures of perchlorinated oligosilanes $Si_nCl_{2n+2}$ (n≥2). It is only at about 200° C. or higher that the oligosilanes undergo a further reaction to form $SiCl_4$.

E. Bonitz reports in Chemische Berichte 94 (1961) 220 and Angewandte Chemie 78 (1976) 475 that, after $CaSi_2$ has been ground in suitable solvents, $Cl_2$ will convert the solid material at <60° C. initially into silicon and then into chlorinated products $SiCl_x$ (x<1) up to SiCl. Higher temperatures then produce soluble products $SiCl_x$ (1<x<2), until finally $Si_nCl_{2n+2}$ compounds are obtained. The oxidation of SiCl is supported by finely divided transition metals, such as Fe, Cu or Ni.

DE 1079607 and DE 1132901 disclose that grinding silicon or silicon alloys (ferrosilicon for example) with catalytically active metals or metal compounds in liquid diluents leads to suspensions whose silicon content reacts quantitatively with chlorine gas to form $Si_nCl_{2n+2}$ (n≥2). The oxidative cleavage of perchlorinated polysilanes with chlorine gas at temperatures that are not too high, therefore, is a suitable way to obtain mixtures of perchlorinated oligosilanes in high yields, based on the amount of silicon used. Although ($Si_2Cl_6$) is the main constituent in these mixtures, the mixtures however also contain the other oligosilanes in proportions of typically >25 wt. %, so that, as mentioned above, extensive separation processes are required to isolate the hexachlorodisilane.

The E. Bonitz approach presupposes an activation, viz., a technically laborious, intensive grinding of the silicon-containing starting materials with the addition of liquid diluents and, furthermore, the use of catalytically active metals or metal compounds.

In addition, the present disclosure provides a chimney tray having an array of chimneys, which enables a reactant to be uniformly and appropriately distributed to a catalyst bed.

It could therefore be helpful to provide a method for producing hexachlorodisilane in a particularly simple manner and a particularly high yield, based on the amount of silicon used.

SUMMARY

We provide a method of producing hexachlorodisilane ($Si_2Cl_6$) including oxidatively cleaving chlorinated polysilane of the formula $SiCl_x$ (x=0.2-0.8) by chlorination.

DETAILED DESCRIPTION

Figure 1:
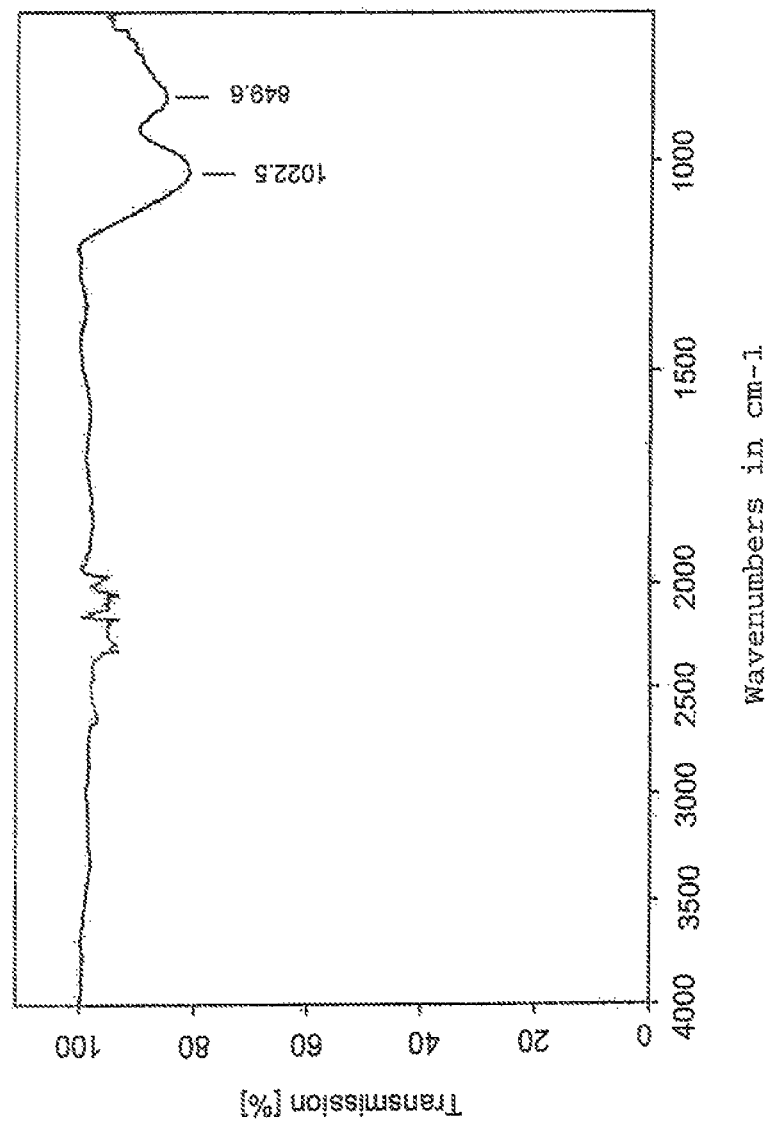
FIG. 1 is an illustration of an IR spectra of a chloride-containing silicon of the composition $SiCl_{0.05}$ to $SiCl_{0.07}$.

We provide a method for producing hexachlorodisilane that is characterized in that chlorinated polysilane of the empirical formula $SiCl_x$ (x=0.2-0.8) is oxidatively cleaved using chlorination.

The chlorinated polysilane of the empirical or analytical formula $SiCl_x$ where x=0.2 to 0.8 is a highly crosslinked chlorinated polysilane since x as <1. Hence, the compound has a spatial silicon scaffold which in addition to silicon centers with one or more chlorine substituents must, likewise possess silicon centers having no chlorine substituent, but rather only bonds leading to further silicon centers or atoms. In contrast, chlorinated polysilanes of the empirical or analytical formula $SiCl_x$ where 1<x<2 are compounds which only have a relatively low degree of crosslinking since, on average, each silicon atom has at least one chlorine substituent. These polysilanes can be characterized, for example, by a sheetlike, two-dimensional structure which, compared with compounds having a chain and/or ring structure and x≥2, additionally has crosslinking sites.

Surprisingly, we found that the oxidative, degradation of highly crosslinked chlorinated polysilanes of the empirical formula $SiCl_x$ (x=0.2-0.8) lead not to mixtures of multiple products, but exclusively to hexachlorodisilane ($Si_2Cl_6$). By "exclusively" here is meant that the product may additionally also contain small amounts of $SiCl_4$ and/or small amounts of insoluble residuals.

The highly crosslinked chlorinated polysilanes of the abovementioned empirical formula concerned here can also be referred to as "chloride-containing silicon" because of their composition and structure. The oxidative degradation of such chloride-containing silicon therefore leads almost exclusively to hexachlorodisilane. Only when the course of the reaction is incomplete, i.e., for example, in the event of premature discontinuation of the reaction, longer-chained silanes can also be formed.

Chlorination can be effected more particularly using a chlorinating, agent capable of releasing or transferring chlorine in molecular form or in atomic form. In particular, chlorine gas ($Cl_2$) is useful as a chlorinating agent. But chlorine-containing compounds are also conceivable, for example, nonmetal chlorides, for instance interhalogen compounds.

The starting material can be more particularly chlorinated polysilane of the empirical formula $SiCl_x$ where x=0.2-0.8, obtained by thermolysis of chloropolysilane, for example $(SiCl_2)_x$, produced via a plasma-chemical process or thermally. Depending on the aftertreatment of the chlorine-containing silicon following thermolysis and handling, the product may, as mentioned, also contain $SiCl_4$ and/or minor amounts of insoluble residuals. The chlorinated polysilane of the empirical formula $SiCl_x$ where x=0.2-0.8 is more particularly obtainable as described in WO 09/143825 A2, the subject matter of which is incorporated herein by reference. Especially, chloropolysilane, is thermally decomposed therein by continuous addition to a reactor wherein, furthermore, the thermal decomposition takes place in the temperature range from 350° C. to 1200° C. in particular.

Plasma-chemically produced chloropolysilane, for example $(SiCl_2)_x$, can more particularly be a halogenated polysilane as a pure compound or as a mixture of compounds each having at least one/direct Si—Si bond, wherein the substituents consist of halogen or of halogen and hydrogen and wherein the atomic ratio for substituent:silicon is at least 1:1 in the composition, wherein
  a. the hydrogen content of the polysilane is less than 2 atomic %,
  b. the polysilane contains almost no branched chains and rings in that the level of branching points of the short-chain fraction, more particularly of the summed fraction of perhalogenated derivatives of neohexasilane, neopentasilane, isotetrasilane, isopentasilane and isohexasilane is below 1%, based on the entire product mixture,
  c. it has a Raman molecular vibration spectrum of $I_{100}/I_{132}$ above 1, where $I_{100}$ is the Raman intensity at 100 $cm^{-1}$ and $I_{132}$ is the Raman intensity at 132 $cm^{-1}$,
  d. it has its significant product signals in $^{29}$Si NMR spectra in the chemical shift range of +15 ppm to −7 ppm when the substituents are chlorine.

The level of branching points herein is determined by integrating the $^{29}$Si NMR signals for the tertiary and quaternary silicon atoms. "Short-chain" fraction of halogenated polysilanes is to be understood as referring to any silane having up to 6 silicon atoms. Alternatively, the fraction of chlorinated short-chain silanes is particularly quick to determine using the following procedure. First the range of +23 ppm to −13 ppm in the $^{29}$Si NMR is integrated (signals from primary and secondary silicon atoms appear therein in particular) and subsequently the signals for tertiary and quaternary Si atoms in the range of −18 ppm to −33 ppm and −73 ppm to −93 ppm of the respective perchlorinated derivatives of the following compounds: neohexasilane, neopentasilane, isotetrasilane, isopentasilane, and isohexasilane. Thereafter, the ratio of the respective integrations $I_{short-chain}:I_{primary/secondary}$ is determined. This is in respect of the summed integration for the respective perchlorinated derivatives of neohexasilane, neopentasilane, isotetrasilane, isopentasilane and isohexasilane less than 1:100.

In addition, the synthesis and characterization of these long-chain halogenated polysilanes is described in WO 2009/143823 A2, the subject matter of which is incorporated by reference.

It is further possible to use perhalogenated polysilanes as described in WO 2006/125425 A1, the subject matter of which is likewise incorporated herein by reference, although it must be noted that the plasma used there has a higher power density, and this leads to a changed spectrum of products.

Thermally produced chloropolysilane, for example $(SiCl_2)_x$, can more particularly be a chlorinated polysilane as a pure compound or a mixture of compounds which each have at least one direct Si—Si bond and the substituents of which consist of chlorine or of chlorine and hydrogen and in the composition of which the atomic ratio for substituent silicon is at least 1:1, wherein
  a. the polysilane consists of rings and chains having a high proportion of branching points which is >1% based on the entire product mixture,
  b. it has a Raman molecular vibration spectrum of $I_{100}/I_{132}$ less than 1, where $I_{100}$ is the Raman intensity at 100 $cm^{-1}$ and $I_{132}$ is the Raman intensity at 132 $cm^{-1}$,
  c. its significant product signals in $^{29}$Si NMR spectra are in the chemical shift range of +23 ppm to −13 ppm, −18 ppm to −33 ppm and −73 ppm to −93 ppm.

The synthesis and characterization of these branched halogenated polysilanes is described in WO 2009/143824 A2 the subject matter of which is incorporated herein by reference.

In our method, the oxidative cleavage with $Cl_2$ is preferably carried out at a temperature of 80-145° C., in particular 110-130° C., for example, 120° C. In this temperature range, the results obtained in respect of the selective, production of hexachlorodisilane are best with regard to selectivity and yield.

The oxidative, cleavage can more particularly be performed at pressures of 100 hPa to 10000 hPa and is preferably performed at atmospheric pressure (1000 hPa) to 300 hPa overpressure (i.e., 1300 hPa).

If necessary, the end product obtained by the oxidative cleavage can also be subjected to a separating step, especially by condensing out and/or distilling. In the normal case, however, such a separating step is unnecessary, since the method produces hexachlorodisilane almost exclusively, in contradistinction to the prior art.

Preferably, highly crosslinked chlorinated polysilane of the empirical formula $SiCl_x$ where x=0.5-0.7 is used. Such chlorinated polysilanes are particularly favorable with regard to their reactivity.

The chlorinated polysilane may not only consist of silicon and chlorine, but may in addition to these elements also contain hydrogen. This can be beneficial for the yield of the hexachlorodisilane formed. The hydrogen content of the chlorinated polysilane used is in general not above 5 atomic % and usually below 1 atomic %, and can be determined by integration of $^1$H NMR spectra using an internal standard and comparing the resulting integrals at a known mixing ratio.

It has been determined that our method provides hexachlorodisilane in a >60% by weight proportion of the end product, more particularly in a >70% by weight proportion of the end product and even more particularly in a >80% by weight proportion of the end product. The remaining proportion of the end product contains primarily $SiCl_4$ and insoluble solids which cannot be distilled off. Chlorosilanes other than $SiCl_4$ and $Si_2Cl_6$ are typically only obtained to a very small extent.

Their proportion is generally <5% by weight, usually <2% by weight and usually even <1% by weight, and can be determined by integration of $^{29}$Si NMR spectra recorded in solution.

Our method is preferably carried out catalyst-free. There is therefore no need for addition of a catalyst by purpose. This means more particularly of course that, in contradistinction to the prior art, there is no need for a metal catalyst to be added. Nor in general is there any need for the presence of a catalyst, whether by substances already present (via the apparatus, etc.) or in the starting material (via impurities, for example). This is in contrast to the prior art such as E. Bonitz.

Furthermore, the highly crosslinked chlorinated polysilane can be oxidatively cleaved without prior activation. What is meant by this is that there is no need for any prior physical activation, for example, by grinding the substance for surface area enlargement or the further removal of a passivating surface layer, nor for any chemical activation, for example, by etching, etc. This is again in contrast to the prior art such as E. Bonitz.

The method is elucidated in the following description using one comparative and two operative examples.

NMR measurements were carried out at room temperature on an AV 400 NMR spectrometer from Bruker using the pulse program zg30 and a measurement frequency of 59.6 MHz 79.5 MHz (Example 2 only) and in $C_6D_6$ as solvent unless it is stated that a solid-state NMR spectrum is concerned. IR spectra were recorded using a Bruker Optics IFS48 spectrometer with ATR measurement unit ("Golden Gate", diamond window, single reflection). Solid-state NMR spectra were recorded using a Bruker DSX-400 NMR spectrometer, the measurement conditions being on the one hand $^{29}$Si HPDec, 79.5 MHz, rotational frequency: 7000 Hz, externally referenced to TMS=0 ppm, and on the other for $^1$H with the pulse program zg4pm.98 at 400 MHz, rotational frequency: 31115 Hz with 2.5 mm MAS head, referenced to TMS=0 ppm, the measurements were carried out at room temperature.

Comparative Example 62 g of high-viscosity polychlorosilane $(SiCl_2)_x$ were heated to 120° C. Chlorine gas was introduced under stirring. After 19 h the reaction mixture ceased to take up any more chlorine gas. A $^{29}$Si NMR spectrum of the liquid showed signals of $Si_2Cl_6$, $Si_3Cl_8$, iso-$Si_4Cl_{10}$, neo-$Si_5Cl_{12}$ and of further chlorinated oligosilanes. The distillative workup of the reaction mixture yielded 54% by weight of $Si_2Cl_6$ and 25% by weight of $Si_3Cl_8$ (based on the entire product mixture obtained).

Operative Example 1

A solution of $(SiCl_2)_x$ in $SiCl_4$ was decomposed at <450° C. into a red product of the composition $SiCl_{0.5}$. 9 g of this material were suspended in 55 g of $Si_2Cl_6$. Chlorine gas was introduced at 120° C. After 10 h the reaction mixture ceased to take up any more chlorine gas. A $^{29}$Si NMR spectrum of the liquid, in addition to a strong signal of $Si_2Cl_6$, showed only a very weak signal of $SiCl_4$.

Further chlorosilanes are only present in a small amount, if at all. Distillative workup of the product gave 8% of a fraction of $SiCl_4$ with a little $Si_2Cl_6$ and 85% of a further fraction of $Si_2Cl_6$. The distillation residue of 7% consisted largely of $Si_2Cl_6$ with small amounts of insoluble solids.

Operative Example 2

21.02 g of the material produced as mentioned above are suspended in 45.93 g of $Si_3Cl_8$ as solvent and exposed to a stream of chlorine gas at 120° C. After 37.5 h, the flask contents consist according to the $^{29}$Si NMR spectroscopic analysis only of $Si_2Cl_6$ and $SiCl_4$ in addition to the $Si_3Cl_8$ used. Further chlorosilanes are only present in small amounts, if at all.

Comparing the comparative example with operative examples 1 and 2 shows that, the oxidative cleavage of the highly crosslinked chlorinated polysilane according to the invention produces hexachlorodisilane selectively in that further chlorosilanes are only produced in a small amount, if at all. When high-viscosity polychlorosilane $(SiCl_2)_x$ is used, a mixture of multiple products is obtained instead.

Figure 2:
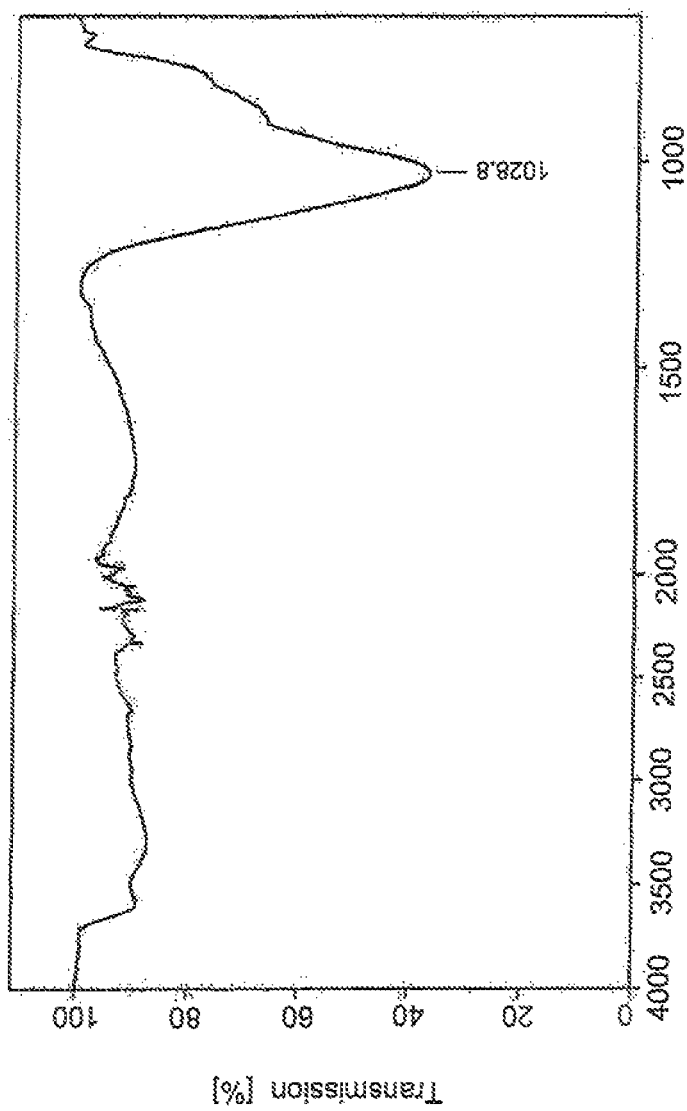
FIG. 2 shows an IR spectra of a chloride-containing silicon of the composition $SiCl_{0.7}$.

FIGS. 1 and 2 below show IR spectra of a chloride-containing silicon of the composition $SiCl_{0.05}$ to $SiCl_{0.07}$ (FIG. 1) and of $SiCl_{0.7}$ (FIG. 2).

Figure 3:
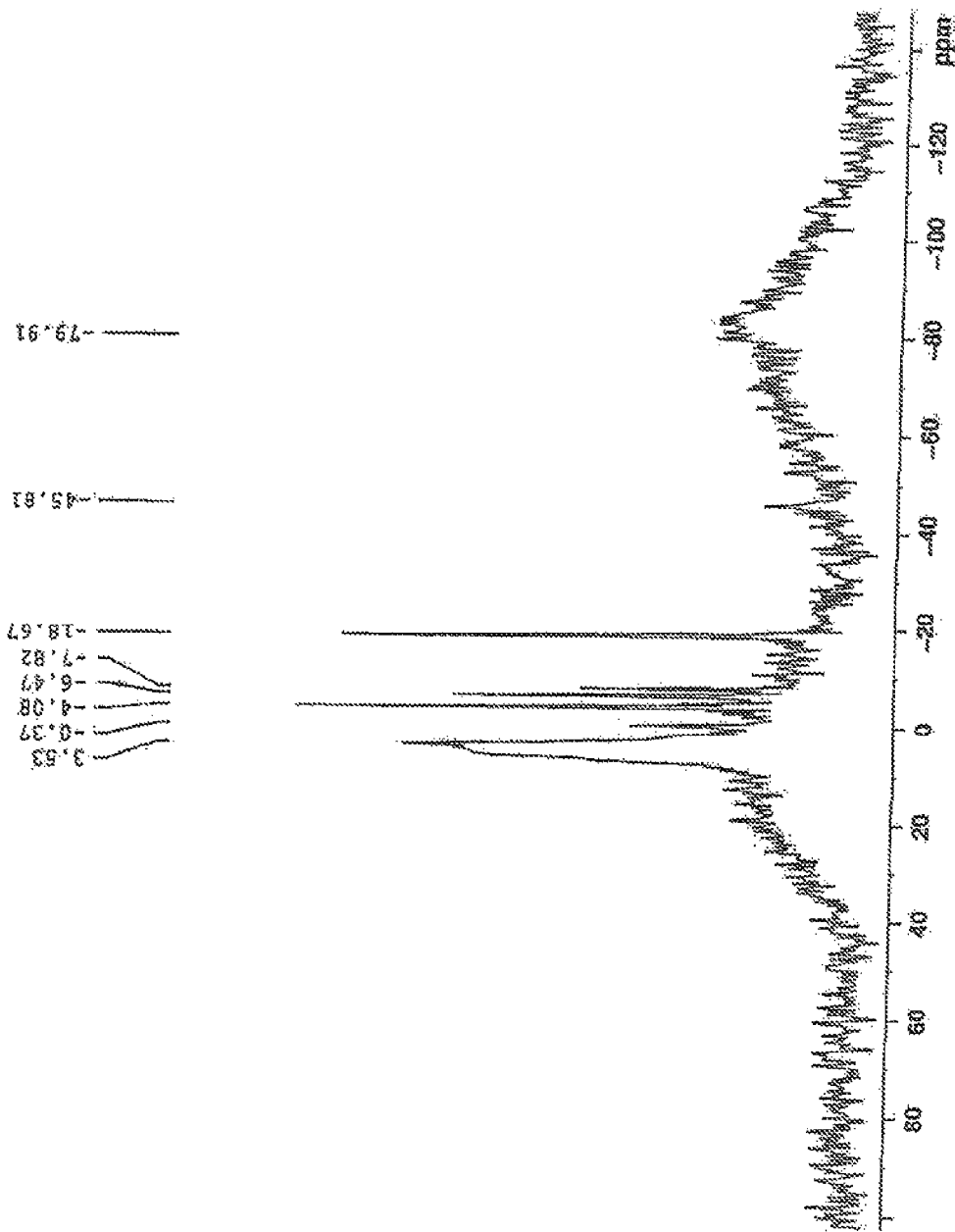
FIG. 3 shows a $^{29}Si$ solid state NMR spectra of a chloride-containing silicon having the empirical formula $SiCl_{0.7}$.
Figure 4:
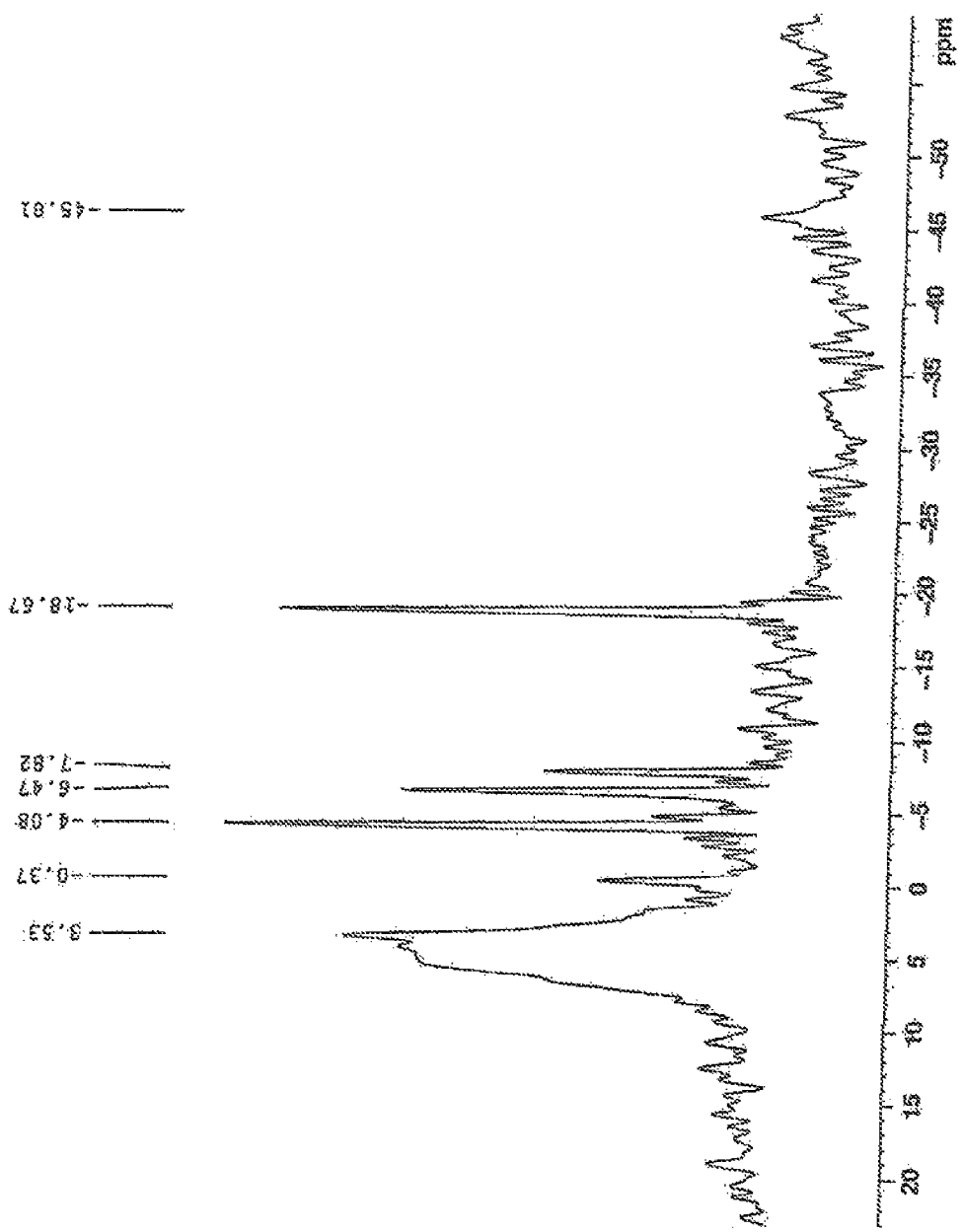
FIG. 4 shows a portion of a detailed $^{29}Si$ solid-state NMR spectra taken from FIG. 3.
Figure 5:
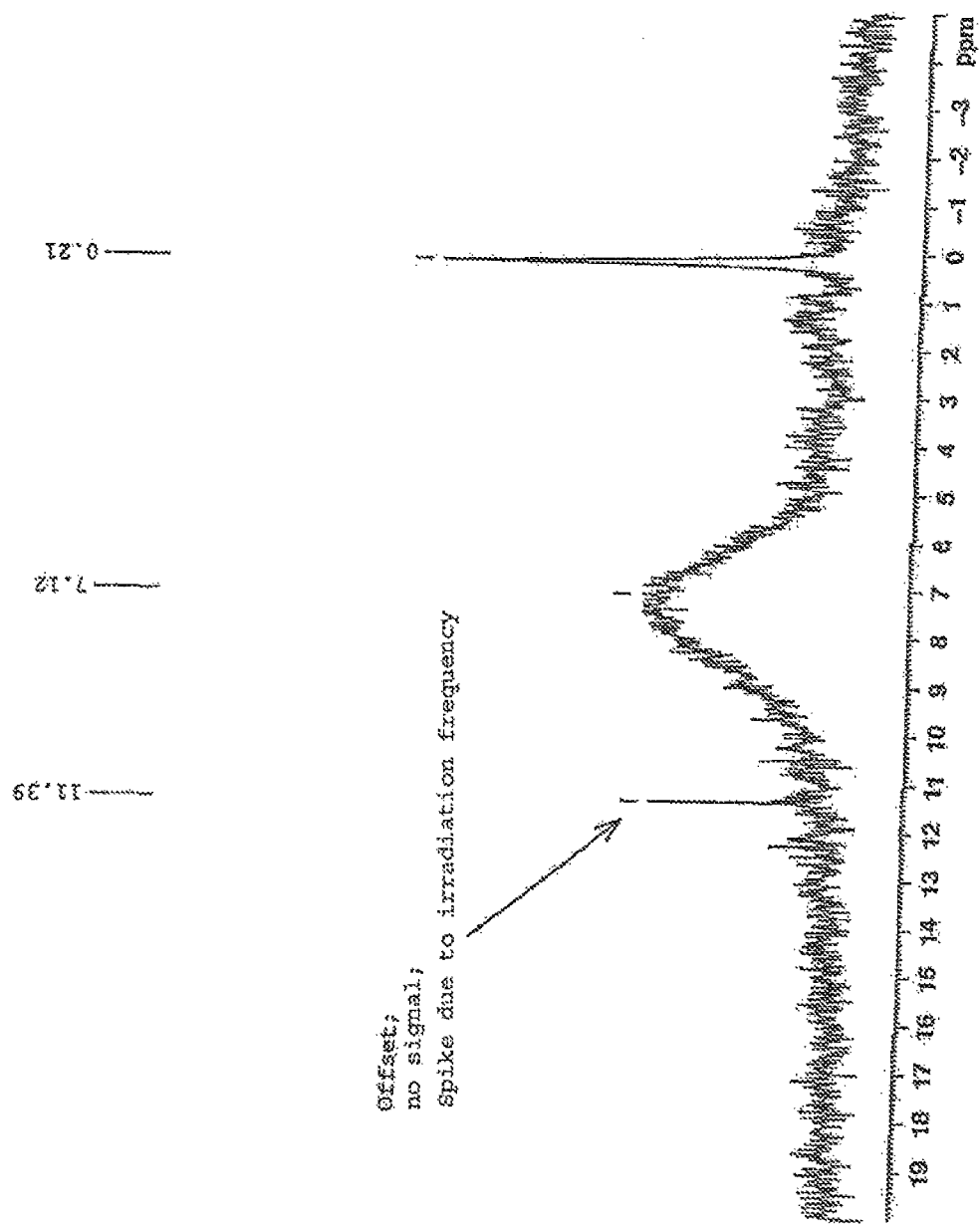
FIG. 5 shows a $^1H$ solid state NMR spectra of a chloride-containing silicon having the empirical formula $SiCl_{0.7}$.

FIGS. 3 and 4 show $^{29}$Si solid-state NMR spectra of a chloride-containing silicon having the empirical formula $SiCl_{0.7}$. FIG. 5 shows the $^1$H solid-state NMR spectrum relating to the chloride-containing silicon having the empirical formula $SiCl_{0.7}$.

Figure 6:
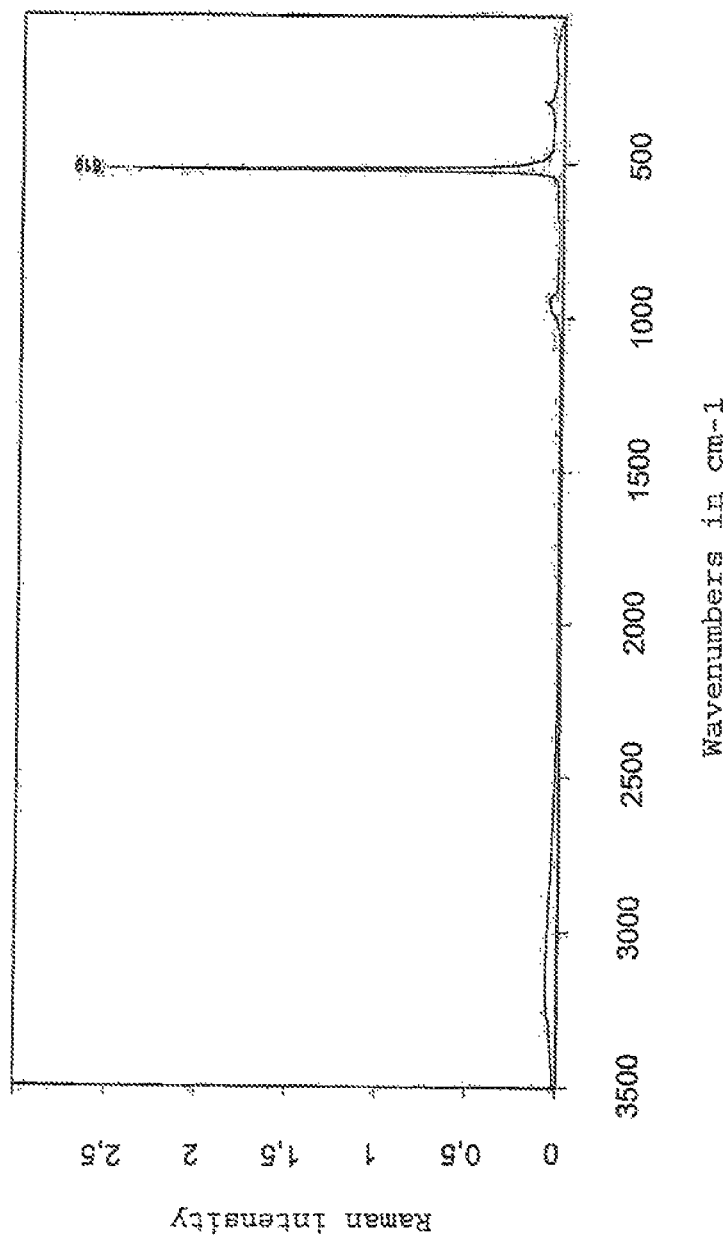
FIG. 6 shows a $^{29}Si$ solid state NMR spectrum of a reaction mixture after reaction of chloride-containing silicon with chlorine in $Si_2Cl_6$.
Figure 7:
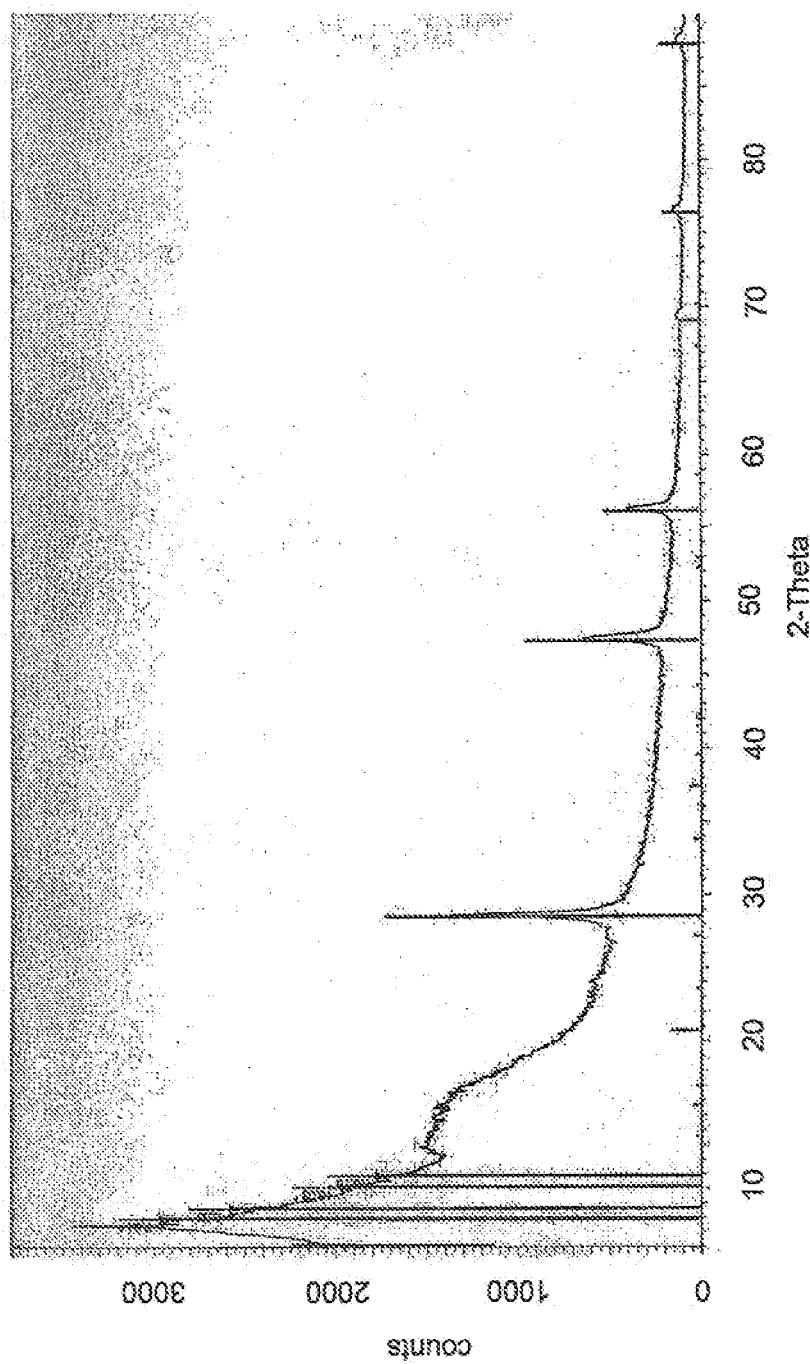
FIG. 7 shows a $^{29}Si$ solid state NMR spectrum of a reaction mixture after reaction of chloride-containing silicon with chlorine in $Si_3Cl_8$.

FIG. 6 shows the $^{29}$Si solid-state NMR spectrum of the reaction mixture after the reaction of chloride-containing chlorine in $Si_2Cl_6$. FIG. 7 shows the $^{29}$Si solid-state NMR spectrum of the reaction mixture after the reaction of chloride-containing silicon with chlorine in $Si_3Cl_8$. The broad signal with the maximum at about −100 ppm is attributable to the glass of the NMR tube. The signals at −19 ppm must each be assigned to $SiCl_4$.

The invention claimed is:

1. A method of producing hexachlorodisilane ($Si_2Cl_6$) comprising:
   carrying out a thermolysis of chloropolysilane at 350 to 1200° C. to produce chlorinated polysilane of formula $SiCl_x$, where x is 0.2-0.8, and
   oxidatively cleaving the chlorinated polysilane by chlorination.

2. The method according to claim 1, wherein the chlorination is effected with chlorine gas.

3. The method according to claim 2, wherein the oxidative cleavage is effected at a temperature of 80-145° C.

4. The method according to claim 1, wherein the oxidative cleavage is effected at an atmospheric pressure to 300 mbar overpressure.

5. The method according to claim 1, wherein an end product obtained by the oxidative cleavage is subjected to a distillation separating step.

6. The method according to claim 1, wherein the chlorinated polysilane is obtained by thermolysis of $(SiCl_2)_x$ produced by a plasma-chemical process.

7. The method according to claim 1, wherein the chlorinated polysilane is obtained by thermolysis of $(SiCl_2)_x$ produced by a thermal process.

8. The method according to claim 1, wherein x=0.5-0.7.

9. The method according to claim 1, wherein hexachlorodisilane is obtained in a >60% by weight proportion of an end product obtained by the oxidative cleavage.

10. The method according to claim 1, performed catalyst-free.

11. The method according to claim 1, performed without adding a catalyst.

12. The method according to claim 1, wherein the chlorinated polysilane is oxidatively cleaved without prior activation.

* * * * *